S. A. CRONE.
BRAKE BEAM.
APPLICATION FILED JAN. 28, 1922.
1,432,234.
Patented Oct. 17, 1922.
3 SHEETS—SHEET 1.
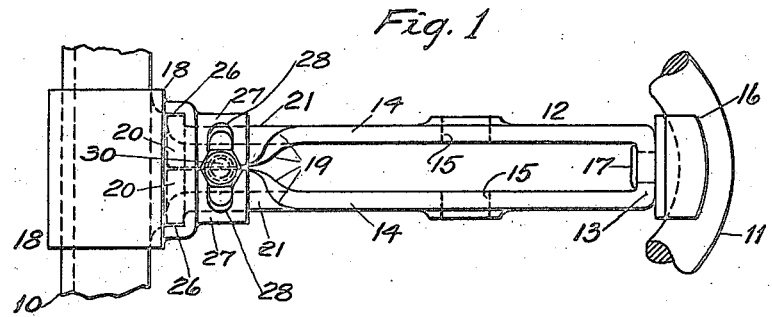
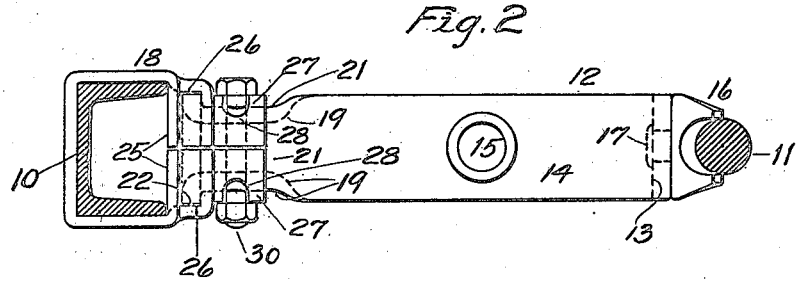
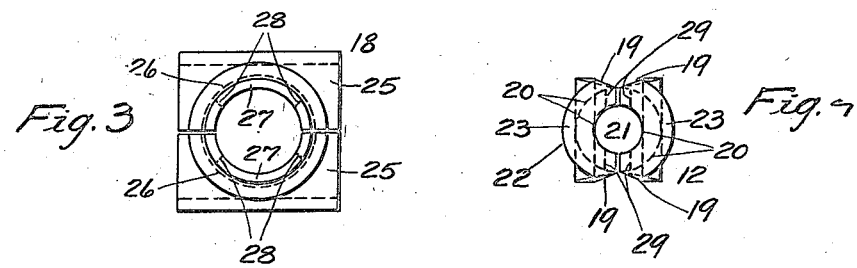
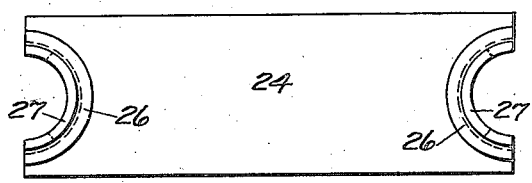
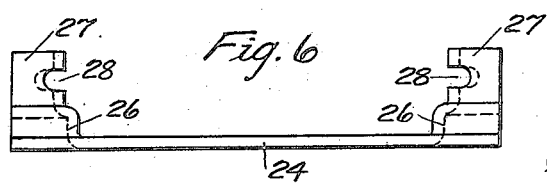
INVENTOR:
Seth A. Crone,
BY
Charles C. Gill.
ATTORNEY.

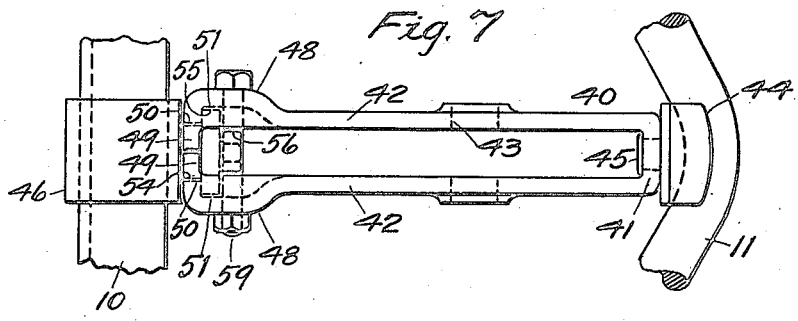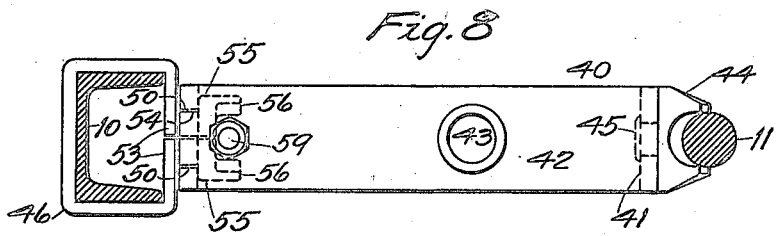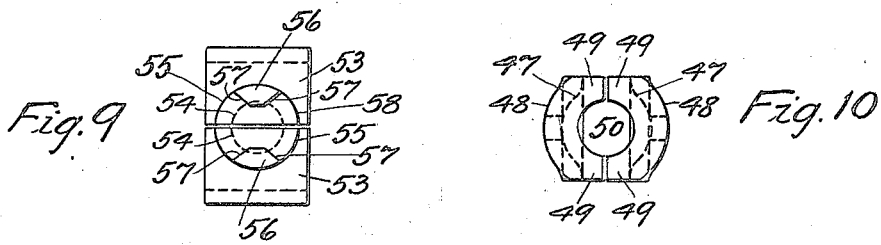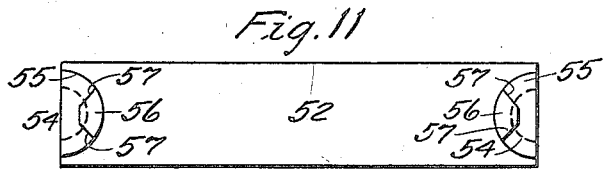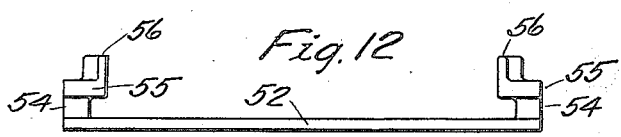

S. A. CRONE.
BRAKE BEAM.
APPLICATION FILED JAN. 28, 1922.
1,432,234.
Patented Oct. 17, 1922.
3 SHEETS—SHEET 3.
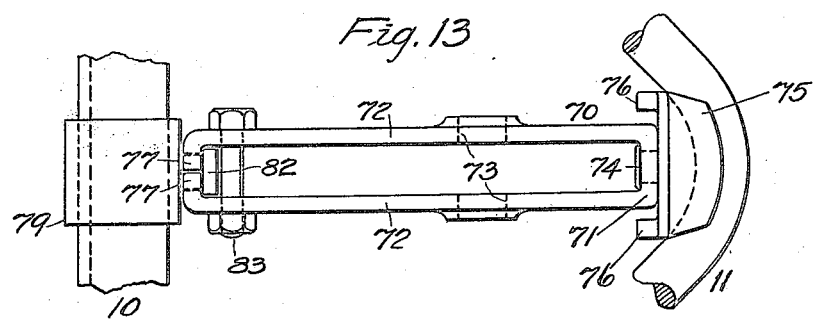
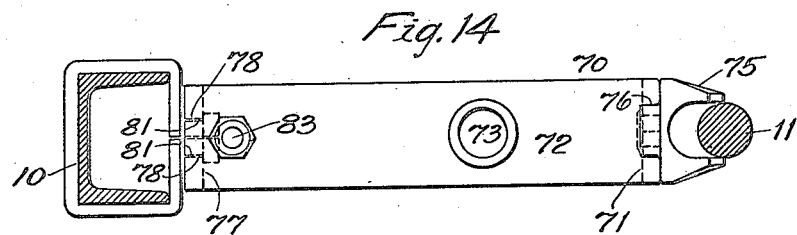
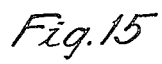
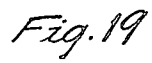
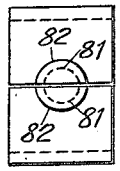
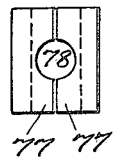
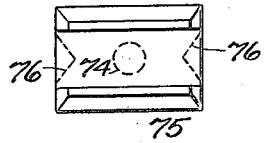
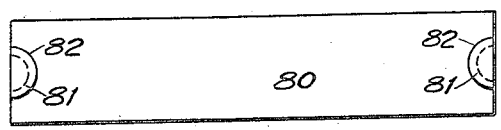
INVENTOR:
Seth A. Crone.
BY
Charles C. Gill,
ATTORNEY.

Patented Oct. 17, 1922.

1,432,234

UNITED STATES PATENT OFFICE.

SETH A. CRONE, OF EAST ORANGE, NEW JERSEY.

BRAKE BEAM.

Application filed January 23, 1922. Serial No. 532,465.

*To all whom it may concern:*

Be it known that I, SETH A. CRONE, a citizen of the United States, and a resident of East Orange, in the county of Essex and State of New Jersey, have invented certain new and useful Improvements in Brake Beams, of which the following is a specification.

The invention pertains more particularly to a novel reversible strut or fulcrum and means for securing the same to the compression and tension members of a brake beam.

One object of the invention is to provide a highly efficient strut adapted for use at either end of the car truck and preferably having means for arresting the body of the same when turned in one direction or the other to the requisite angle for the brake lever, this angle usually being 40° from the vertical.

A further purpose of the invention is to provide a reversible or rotary strut in one piece of forged metal, the strut being formed by bending a forged metal bar at its middle portion to afford a forward end for connection with the tension member of the beam and parallel spaced apart sides to receive between them the brake lever, the back portions of said sides being so shaped as to be adapted for interlocking engagement with a loop encompassing the compression member of the beam. The strut of my invention possesses great strength, durability and efficiency, without undue weight of metal, and special advantages in respect to readiness of application to position and to withstanding the severe treatment to which struts of trussed brake beams are subjected. The strut of my invention may also be regarded as a brake lever fulcrum or lever post.

My invention admits of modification within the scope of the appended claims, and I have illustrated in the drawings several embodiments of the invention in its broader scope.

The invention will be fully understood from the detailed description hereinafter presented, reference being had to the accompanying drawings, in which:

Fig. 1 is a top view of a reversible strut or fulcrum embodying my invention, the same being shown, for clearness of illustration, with its corresponding sides turned vertically and in connection with portions of the compression and tension members of a brake-beam;

Fig. 2 is a side elevation of the same, the compression and tension members of the brake-beam being shown in section;

Fig. 3 is a detached elevation of the inner end of the loop member which in use is applied upon the compression member to receive one end of the strut;

Fig. 4 is a detached elevation of the inner end of the strut, being that end of the strut which engages with the end of the loop member shown in Fig. 3;

Fig. 5 is a plan view of the bar of which the loop member is formed before said bar is folded or bent to conform to the cross-section of the compression member;

Fig. 6 is an edge view of the same;

Figs. 7 to 12 respectively are views corresponding with Figs. 1 to 6 respectively, showing a modified construction embodying my invention, and Figs. 13 to 19 inclusive illustrate a further modified construction embodying some of the features of my invention, Figs. 13 to 18, respectively, corresponding with Figs. 1 to 6, respectively, and Figs. 7 to 12, respectively, and therefore not requiring further detailed description, and Fig. 19 being a front end view of the shoe pivoted to the strut and engaging the tension member of the brake beam.

In the drawings, referring to Figs. 1 to 6 inclusive, 10 designates the compression member, 11 the tension member, and 12 the strut comprising the brake-beam, which except for the strut and its associated features may be of any usual or suitable construction.

The strut 12 is formed from a single bar of forged metal folded at its middle portion to provide a front end 13 and corresponding properly spaced apart sides 14 to receive between them the usual brake-lever, not shown, said sides being formed with corresponding reinforced openings 15 for the brake-lever pin.

The front end 13 of the strut has pivotally secured to it a shoe 16 which is grooved to receive and afford a convex bearing for the middle portion of the truss rod or tension member 11, as shown in Fig. 1. The back of the shoe 16 presents a substantially flat surface to engage the forward end of the strut 12 and is provided with a pin 17 which extends through a hole in the front end 13 of the strut and is headed at the inner face of said end 13. The pin 17 acts as a pivot at the front end of the strut to permit the strut to be turned to the right or left on its longitudinal axis to take the desired angle for the brake-lever.

At the back end of the strut the sides thereof are given a special formation adapting them for cooperation with the loop member 18 which transversely encompasses the compression member 10 and receives said end of the strut, said loop member at its forward side and said end of the strut having a special cooperative relation whereby the strut is not only securely held but is capable of pivotal action permitting it to be turned to the right or left to the angle desired for the brake-lever.

The strut sides 14 at their back end portions, are transversely and correspondingly rounded toward each other, as at 19, to form two matching semi-circular sections 20 which together form a hollow longitudinal neck 21 on the longitudinal axis of the strut, and at their extreme back edges said sides 14 are flanged outwardly in a direction from each other about said neck, thereby forming a disk-like head 22 on said sides, said head comprising matching substantially semi-circular flanges 23, as shown in Fig. 4.

The strut 12 is therefore a single bar of forged metal bent at its middle portion to form the end 13 and sides 14 and at its ends being correspondingly shaped to form the circular longitudinal neck 21 and disk-like head 22.

The loop member 18 is preferably formed from a forged metal bar 24 whose body portion is bent to the cross-section of the beam 10 and whose end portions which are to match and engage the strut, are of special formation. The end portions of the bar 24 are bent toward each other at the front of the compression member, as at 25, and each end 25 at its middle portion is fashioned to form a semi-circular inwardly offset recess 26 and along the edge thereof a forwardly projecting semi-circular flange 27. When the end portions of the bar 24 are matched together, as shown in Figs. 1, 2 and 3, the semi-circular recesses 26 form a circular recess to receive and confine the disk-like head 22 on the strut and the semi-circular flanges 27 form a circular band receiving the neck 21 formed on the strut, and in this manner the strut becomes securely connected with the loop-member 18 and therethrough with the compression member 10 but has capacity for rotary motion within said recess and band.

It is preferable that means be provided for arresting the strut 12 when the same is turned to either one side or the other to lie at the proper angle for the brake-lever, said angle usually being 40° from the vertical, and to this end I recess the opposite side edges of the flanges 27 to form, when said flanges and edges are matched together, transverse slots 28 of definite length, and therethrough and through aligned holes 29 formed in the inturned portions 19 of the strut-sides, I insert a bolt 30 which closely fits the holes 29 and may turn angularly with the strut until arrested at diagonally opposite ends of the slots 28, said ends of the slots cooperating with the end portions of the bolt to arrest the strut when turned in one direction or the other to lie at the desired angle.

I have hereinbefore described the preferred embodiment of my invention and the method of employing the same will doubtless be well understood without further extended explanation. The strut 12 will be turned either to the right or left in accordance with the position of the brake beam on the car, and the brake lever will be secured in a customary manner between the sides 14 of the strut. The manner of securing the forward end of the strut to the shoe 16 and the beam end of the strut to the loop member 18 permits the strut to have rotary movement on its longitudinal axis to the extent required for setting the same at the desired angle to suit the brake lever. As a guide to the setting of the strut at the proper angle, I provide means for arresting the strut upon reaching the proper angle when turned in either direction, these means comprising the slots 28 and bolt 30. The strut in its construction and in its connection with the compression member and tension member possesses a high degree of efficiency, strength and durability and may be readily applied to position. One of the very beneficial features of the strut is that it is made from one integral bar of forged metal and provides a construction permitting its forward end to be properly connected with the tension member of the beam and its back end to be readily interlocked with the loop member on the compression member of the beam, said back end of the strut being of special formation imparting great strength to that end of the strut.

In Figs. 7 to 12 inclusive I illustrate a modified embodiment of my invention, and therein 10 designates the compression member, 11 the tension member, and 40 the strut, which, as in the case of the strut shown in Fig. 1, is formed from a single bar of forged metal folded at its middle portion to provide a front end 41 and corresponding spaced-apart sides 42 to receive between them the brake lever and having aligned openings 43 for the brake lever pin. The forward end of the strut has a shoe 44 pivotally connected with it and adapted to engage the tension member 11, the shoe being secured by a rivet 45 serving as the pivotal connection of the shoe 44 with the strut. The shoe 44 corresponds with the shoe 16 of Fig. 1. The construction shown in Figs. 7 to 12 inclusive differs from the construction shown in Fig. 1 only in the formation of the back end of the strut and a consequent change in the formation of the loop member 46 which transversely encompasses the compression beam 10. At the back end of the strut 40 the sides thereof are between their opposite longitudinal edges bulged outwardly in opposite directions on arcuate lines indicated by the dotted lines 47 and solid lines 48 in Fig. 10, and at their extreme back end edges said sides 42 are flanged inwardly on simi-circular lines as indicated at 49, thereby forming a circular neck 50 on the longitudinal axis of the strut and creating interior recesses 51 forwardly of said flanges 49, as indicated by dotted lines in Fig. 7, the recesses 51 also being defined by the arcuate dotted lines 47 in Fig. 10. The recesses 51 are formed one in the back end of one side 42 and one in the back end of the other side 42, as shown in Fig 7. The inwardly turned flanges 49, 49 are of semi-circular outline and close the outer end of the recesses 51 and also substantially close the space which lies between the two strut sides 42. The special formation described of the back end of the strut is for adapting said strut to interlock with the loop member 46, as will be presently described.

The loop member 46 is formed from a forged metal bar 52 whose body portion is bent to the cross-section of the beam 10 and whose end portions are fashioned to match each other and be engaged by the back end of the strut. The end portions of the bar 52 are bent toward each other at the front of the compression member, as at 53, and at each end 53 of the bar is formed a semi-circular neck-member 54 and a semi-circular flange 55 thereon which is partly offset from the neck-member and formed with a forwardly projecting lug or tongue 56 forming at its side edges shoulders 57. When the end portions of the bar 52 are matched together as in Figs. 7, 8 and 9, the neck-members 54 and flanges 55 meet each other and form a circular neck which I designate in Fig. 9 by the numeral 58, said neck being shown by dotted lines in Figs. 7 and 8, and in which also it may be seen that the parts 56 thereof project forwardly. The portions 54 of the neck 58 lie within the circular opening 50 formed between the inner edges of the strut flanges 49, and the flanged portions 55 of said neck extend within the recesses 51 formed in the facing sides of the strut members 42, as shown in Fig. 7. The forwardly projecting parts 56 of the neck 58 are employed as stops, in connection with the transverse bolt 59, for arresting the strut when turned to one side or the other to the proper angle to suit the requirements of the brake lever. The bolt 59 extends transversely through the sides of the strut at the back end thereof and crosses the recesses 51 and extends between the stop lugs or portions 56, as shown more clearly in Fig. 8. When the strut 40 is turned to one side the diagonally opposite angular edges of the lugs 56 will strike the bolt 59 and arrest the strut at the proper angle. The lugs 59 have the angular edges 57 so that both edges of the lugs 56 may operate as stops in connection with the bolt 59, two diagonally opposite edges of the lugs 56 striking the bolt 59 when the strut is turned in one direction and the other two diagonally opposite edges 57 of the lugs 56 striking the bolt when the strut is turned in the opposite direction.

In the construction shown in Figs. 7 to 12 inclusive, the back ends of the sides of the strut are bulged outwardly to engage and enclose the neck and head formed on the loop member 46, whereas in the construction shown in Figs. 1 and 2 the loop member and back end of the strut are so constructed that the loop member encloses the back end of the strut. I present Fig. 7 to illustrate that instead of the members of the loop which engage the compression beam 10 enclosing the back end of the strut, as shown in Figs. 1 and 2, the reverse condition may be established, to-wit, that the back ends of the sides of the strut may enclose a head on the loop member of the compression beam. In both forms of my invention shown in Figs. 1 and 7 the construction is entirely efficient and durable and capable of convenient manufacture, but for my purposes I at this time prefer the construction shown in Fig. 1.

I may add in respect to the construction shown in Fig. 7 that the bolt 59 while cooperating with the stop lugs 56 also serve to bind the back ends of the sides of the strut in position to securely enclose the head 58 formed on the loop member 46.

In Figs. 13 to 19 inclusive showing a further modified construction of my invention, 10 designates the compression member of the brake beam, 11 the tension member and 70 the strut, which as in the other illustrations of my invention, is formed from a single bar of forged metal folded to provide a front end 71 and parallel sides 72 to receive the brake lever and having openings 73 for the brake lever pin. The forward end 71 of the strut has pivotally secured thereto by a rivet 74 a shoe 75 formed with an arcuate groove to receive the tension member 11 and with backwardly projecting lugs 76 to form stops for arresting the strut 70 when turned to one direction or the other for positioning said strut to receive the brake lever. At the back end of the strut 70 the sides thereof are flanged toward each other, as at 77, to close the end of the strut, except at the longitudinal center thereof where said flanges 77 are oppositely recessed on arcuate lines to form a circular opening 78.

The loop-member 79 which encompasses the compression member 10 and interlocks with the back end of the strut 70, is formed from a bar 80 shown in Figs. 17 and 18 whose end portions are formed with semicircular neck-members 81 and at the outer ends thereof semi-circular heads 82. When the ends of the bar 80 are brought together at the inner side of the strut, the neck and head sections 81, 82 match each other and form a circular neck having a head thereon, as shown in Figs. 13, 14 and 15. The neck portions 81 of the loop member 79 are received within the opening 78 at the back end of the strut and the head sections 82 are confined between the sides of the back end of the strut forwardly of the flanges 77. The sides 72 of the strut are bolted together at the back end of the strut by a bolt 83 which keeps the sides of the strut at the back end thereof closely engaged with the neck and head formed on the loop member 79, but permits the strut to have rotary motion on said neck and head. When the strut is turned in one direction, opposite diagonal corner portions of its forward end will strike the stop lugs 76 at diagonally opposite sides thereof and arrest the strut at the proper angle, and when said strut is turned in the reverse direction, the other two diagonally opposite corner portions of the front end thereof will strike the other diagonally opposite edges of the lugs 76 and thereby the strut will become arrested at the proper angle, which is usually forty degrees from the vertical.

In the construction shown in Figs. 13 to 19 inclusive, the strut is of rotary character and the means for stopping the same at the ends of its proper angular movement are at the front end of the strut, whereas in the construction shown in Figs. 1 to 12 inclusive, the stop features are provided at the back end of the strut.

The construction shown in Figs. 13 to 19 inclusive is one which may be manufactured with great ease and at minimum expense and possesses some of the advantages of the strut shown in Fig. 1.

My invention admits of other modifications not necessary to describe, but I may add that the compression member 10 may be of any suitable cross-section and that the loop members 18, 46, 79 will be conformed thereto.

What I claim as my invention and desire to secure by Letters Patent, is:—

1. In a brake-beam, a strut interposed between the compression and tension members thereof and means pivotally connecting the ends of the strut with said members, said strut being formed from a single bar of forged metal bent to form a front end and parallel sides.

2. In a brake-beam, a strut interposed between the compression and tension members thereof and means pivotally connecting the ends of the strut with said members, said strut being formed from a single bar of forged metal bent to form a front end and parallel sides, and stops being provided to arrest the strut when turned in one direction or the other to the proper angle for the brake-lever.

3. In a brake-beam, a strut interposed between the compression and tension members thereof and means pivotally connecting the ends of the strut with said members, said strut being formed from a single bar of forged metal bent to form a front end and parallel sides, the means connecting the front end of the strut to the tension member being a shoe grooved to engage said member and pivoted at its back to the front end of the strut.

4. In a brake-beam, a strut interposed between the compression and tension members thereof and means pivotally connecting the ends of the strut with said members, said strut being formed from a single bar of forged metal bent to form a front end and parallel sides, and said sides at the back end of the strut being flanged laterally to afford engaging means, the means connecting said strut at its back end to the compression member being a bar transversely encompassing said member and having matching portions at its ends conforming to and in interlocking engagement with said flanged engaging means.

5. In a brake-beam, a strut interposed between the compression and tension members thereof and means pivotally connecting the ends of the strut with said members, said strut being formed from a single bar of forged metal bent to form a front end and parallel sides, and said sides at the back end of the strut being flanged laterally to afford engaging means, the means connecting said strut at its back end to the compression member being a bar transversely encompassing said member and having matching portions at its ends conforming to and in interlocking engagement with said flanged engaging means, and means being provided to arrest the strut when turned in one direction or the other to the proper angle for the brake-lever comprising a bolt extending transversely through the strut and oppositely disposed stops on the end portions of said bar in the path of said bolt.

6. In a brake-beam, a strut interposed between the compression and tension members thereof and means pivotally connecting the ends of the strut with said members, said strut being formed from a single bar of forged metal bent to form a front end and parallel sides, and said sides at the back end of the strut being laterally rounded and at their end edges laterally flanged to afford engaging means, and the means connecting said strut at its back end to the compression member being a bar transversely encompassing said member and having matching portions at its ends conforming to the strut formation at its back end and interlocked therewith.

7. In a brake-beam, a strut interposed between the compression and tension members thereof and means pivotally connecting the ends of the strut with said members, said strut being formed from a single bar of forged metal bent to form a front end and parallel sides, and said sides at the back end of the strut being laterally rounded and at their end edges laterally flanged to afford engaging means, and the means connecting said strut at its back end to the compression member being a bar transversely encompassing said member and having matching portions at its ends conforming to the strut formation at its back end and interlocked therewith, and means being provided to arrest the strut when turned in one direction or the other to the proper angle for the brake-lever comprising a bolt extending transversely through the strut and oppositely disposed stops on the end portions of said bar in the path of said bolt.

8. In a brake-beam, a strut interposed between the compression and tension members thereof and means pivotally connecting the ends of the strut with said members, said strut being formed from a single bar of forged metal bent to form a front end and parallel sides, and said sides at the back end of the strut being laterally rounded toward each other to form a circular neck-portion and at their extreme ends being flanged outwardly in opposite directions to form a circular head, and the means connecting said strut at its back end to the compression member being a bar transversely encompassing said member and having matching portions at its ends conforming to and receiving said neck and head and interlocking therewith.

9. In a brake-beam, a strut interposed between the compression and tension members thereof and means pivotally connecting the ends of the strut with said members, said strut being formed from a single bar of forged metal bent to form a front end and parallel sides, and said sides at the back end of the strut being laterally rounded toward each other to form a circular neck-portion and at their extreme ends being flanged outwardly in opposite directions to form a circular head, and the means connecting said strut at its back end to the compression member being a bar transversely encompassing said member and having matching portions at its ends conforming to and receiving said neck and head and interlocking therewith, said matching portions being connected together on the strut by a bolt extending through them and the strut.

10. In a brake-beam, a strut interposed between the compression and tension members thereof and means pivotally connecting the ends of the strut with said members, said strut being formed from a single bar of forged metal bent to form a front end and parallel sides, and said sides at the back end of the strut being laterally rounded toward each other to form a circular neck-portion and at their extreme ends being flanged outwardly in opposite directions to form a circular head, and the means connecting said strut at its back end to the compression member being a bar transversely encompassing said member and having matching portions at its ends conforming to and receiving said neck and head and interlocking therewith, said matching portions being connected together on the strut by a bolt extending through them and the strut, and said bolt being rigid with the strut and said matching portions being slotted to permit rotary movement of the bolt with the strut and afford stops at the ends of the slots to cooperate with the bolt in arresting the strut when turned to the proper angle for the brake-lever.

11. In a brake beam, a lever-post consisting of a single bar of forged metal bent to form a front end and parallel sides whose back ends are flanged laterally to afford engaging means, and means connecting the back end of said lever-post to the beam member consisting of a forged metal bar transversely encompassing said member and having formed-up matching portions at its ends conforming to and in interlocking engagement with said flanged engaging means.

12. In a brake beam, a lever-post comprising parallel forged metal sides to receive between them the brake-lever and whose back ends are flanged laterally to afford engaging means, and means connecting said lever post to the beam member consisting of a forged metal bar transversely encompassing said member and having formed-up matching portions at its ends conforming to and in interlocking engagement with said flanged engaging means.

13. In a brake beam, a lever-post comprising parallel sides to receive between them the brake-lever and which sides at the back end of the post are laterally rounded and at their end edges laterally flanged to afford engaging means, and means connecting the back end of said lever-post with the beam member comprising a bar transversely encompassing said member and having matching portions at its ends conforming to the post formation at its back end and interlocked therewith.

14. In a brake beam, a lever post comprising parallel sides to receive between them the brake lever and which sides at the back end of the post are laterally rounded toward each other to form a circular neck-portion and at their extreme back ends are flanged outwardly in opposite directions to form a circular head, and means connecting said post at its back end to the beam member consisting of a bar transversely encompassing said member and having matching portions at its ends to enclose and engage said circular head and enclose said neck portion.

15. In a brake beam, a lever post comprising parallel sides to receive between them the brake lever and which sides at the back end of the post are laterally rounded toward each other to form a circular neck-portion and at their extreme back ends are flanged outwardly in opposite directions to form a circular head, and means connecting said post at its back end to the beam member consisting of a bar transversely encompassing said member and having matching portions at its ends to enclose and engage said circular head and enclose said neck portion, and said matching portions being connected together on the post by a bolt extending transversely through them and the post.

Signed at New York city, in the county of New York and State of New York, this 27th day of January A. D. 1922.

SETH A. CRONE.